United States Patent
Ward et al.

(10) Patent No.: US 7,551,609 B2
(45) Date of Patent: Jun. 23, 2009

(54) DATA STRUCTURE FOR STORING AND ACCESSING MULTIPLE INDEPENDENT SETS OF FORWARDING INFORMATION

(75) Inventors: David Delano Ward, Somerset, WI (US); Pawan Uberoy, Milpitas, CA (US); John H. W. Bettink, San Jose, CA (US); Shyamsundar N. Maniyar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 550 days.

(21) Appl. No.: 11/256,462

(22) Filed: Oct. 21, 2005

(65) Prior Publication Data

US 2007/0091899 A1     Apr. 26, 2007

(51) Int. Cl.
*H04L 12/66* (2006.01)
*H04L 12/56* (2006.01)

(52) U.S. Cl. .................. 370/352; 370/393; 370/395.32; 370/408

(58) Field of Classification Search ........................ None
See application file for complete search history.

(56) References Cited

U.S. PATENT DOCUMENTS

| | | | |
|---|---|---|---|
| 5,781,772 A | | 7/1998 | Wilkinson, III et al. |
| 5,787,430 A | | 7/1998 | Doeringer et al. |
| 5,857,196 A | | 1/1999 | Angle et al. |
| 6,014,659 A | | 1/2000 | Wilkinson, III et al. |
| 6,192,051 B1 | * | 2/2001 | Lipman et al. .............. 370/389 |
| 6,266,706 B1 | * | 7/2001 | Brodnik et al. ............. 709/242 |
| 6,519,248 B1 | * | 2/2003 | Valko ......................... 370/352 |
| 6,560,610 B1 | | 5/2003 | Eatherton et al. |
| 6,697,363 B1 | * | 2/2004 | Carr ........................... 370/389 |
| 6,859,455 B1 | * | 2/2005 | Yazdani et al. .............. 370/392 |
| 6,876,655 B1 | | 4/2005 | Afek et al. |
| 6,891,834 B1 | * | 5/2005 | Dally et al. ............... 370/395.4 |
| 6,915,291 B2 | | 7/2005 | Carlson et al. |
| 7,054,315 B2 | | 5/2006 | Liao |
| 7,106,732 B2 | | 9/2006 | Brown |
| 2002/0143747 A1 | | 10/2002 | Tal et al. |
| 2002/0147721 A1 | * | 10/2002 | Gupta et al. ................. 707/100 |
| 2002/0159466 A1 | * | 10/2002 | Rhoades ..................... 370/408 |
| 2003/0108043 A1 | | 6/2003 | Liao |
| 2003/0174717 A1 | | 9/2003 | Zabarski et al. |
| 2004/0111402 A1 | * | 6/2004 | Waters et al. .................. 707/3 |
| 2004/0236720 A1 | | 11/2004 | Basso et al. |

(Continued)

*Primary Examiner*—Hassan Kizou
*Assistant Examiner*—Ryan C. Kavleski
(74) *Attorney, Agent, or Firm*—The Law Office of Kirk D. Williams

(57) ABSTRACT

Stored in the leaf nodes of a data structure that can be used for identifying the longest prefix matching an address are corresponding values from multiple forwarding information bases. A single common address lookup data structure (e.g., a tree, trie, etc.) can be used, and a leaf node can contain information from multiple forwarding information bases. If lookup operations are performed for a single address in multiple forwarding information bases, the single common address lookup data structure may only need to be traversed once. For example, the forwarding information for another forwarding information base may be stored in the same leaf, further down in the data structure requiring traversal from the current position, or above requiring traversal from the root of the lookup data structure. Information can be stored in the leaf node to indicate which traversal option is appropriate for a particular forwarding information base.

19 Claims, 11 Drawing Sheets

U.S. PATENT DOCUMENTS

| | | |
|---|---|---|
| 2004/0249803 A1* | 12/2004 | Vankatachary et al. ......... 707/3 |
| 2005/0083937 A1* | 4/2005 | Lim ........................... 370/392 |
| 2005/0157712 A1 | 7/2005 | Rangarajan et al. |
| 2005/0171959 A1 | 8/2005 | Deforche et al. |
| 2005/0265328 A1* | 12/2005 | Bettink ....................... 370/389 |
| 2007/0038626 A1 | 2/2007 | Waters et al. |

* cited by examiner

DATA STRUCTURE FOR STORING AND ACCESSING MULTIPLE INDEPENDENT SETS OF FORWARDING INFORMATION This invention was made with government support under Grant Numbers EB000244and CA90841, awarded by NIH. The government has certain rights in the invention

TECHNICAL FIELD

One embodiment of the invention relates to communications and computer systems, especially routers, packet switching systems, and other devices; and more particularly, one embodiment relates to a data structure for storing and accessing multiple independent sets of forwarding information and their use.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

In order for a router or other network device to properly send packets to their respective destinations, forwarding information must be identified for each packet. There are many different known techniques for distributing routing information, with a common one being Border Gateway Protocol (BGP). From this BGP and/or other routing information, packet forwarding information is derived for the device and stored multiple data structures often referred to as forwarding information bases (FIBs). This forwarding information for a particular address may include next hop information (e.g., the address of the next destination to where to send the packet, and the egress interface from which to send the packet), or even include higher-level forwarding information such as that related to virtual local area networks (VLANs), virtual private networks (VPNs), etc., which may require multiple successive lookup operations in multiple FIBs.

Typically, a FIB is implemented in a manner to allow the determination of a longest prefix matching a specified address. There are an unlimited number of known mechanisms for performing lookup operations based on an address to identify a leaf node, such as, but not limited to placing address in an associative memory (e.g., a ternary content-addressable memory), performing a direct or hashed lookup on the address or several strides of the address (i.e., MTRIE, etc.), tree bitmap (e.g., that disclosed in U.S. Pat. No. 6,560, 610, issued May, 6, 2003, which is hereby incorporated by reference), compressed prefix matching database searching (e.g., that disclosed in U.S. Pat. No. 5,781,772, issued Jul. 14, 1998, which is hereby incorporated by reference), and an unlimited number of other lookup mechanisms and approaches.

Shown in FIG. 1A is a prior system which uses tree data structures for identifying a longest matching prefix with the leafs (also often referred to as leaf nodes) populated with the prefixes of interest (i.e., as defined by the FIB). As shown, FIG. 1A illustrates one such prior system with two data structures 100 and 102, each used to store a different FIB. These two FIBs, albeit independent, can be used in forwarding a single packet such as by doing sequential lookup operations on them. In a prior system which is the form of multiple virtual routers emulated by a single physical router, FIBs are exclusively used for their respective virtual router, which can require a lot of memory space. In fact, in one implementation in which multiple virtual routers are emulated on a single line card, the line card does not have enough physical memory space required to store all of the desired FIBs simultaneously.

FIG. 1B illustrates a process used in a prior system for identifying forwarding information of a FIB for a packet, such as that using one of the data structures 100 or 102 shown in FIG. 1A. Processing begins with process block 110, and proceeds to process block 112, wherein the destination address is extracted from the received packet. In process block 114, the longest matching leaf node is set to NULL (i.e., no match located). In process block 116, the longest prefix matching tree is traversed until a leaf node is reached. In process block 118, the longest matching leaf node is set to the current leaf node. As determined in process block 120, if the end of the tree has not been reached, then processing returns to process block 116. Otherwise, the leaf node corresponding to the longest matching prefix has been identified, and in process block 122, the packet is forwarded based on the forwarding information stored in this leaf node. Processing is complete as indicated by process block 124.

FIG. 1C illustrates how a prior system which implements networking services which require sequential lookup operations in multiple FIBs. A first lookup operation is performed in data structure-1 (140) to identify the forwarding information of the first FIB, and then a first lookup operation is performed in data structure-2 (142) to identify the forwarding information of the second FIB. Each of these lookup operations requires traversing the longest prefix matching tree. This sequence of FIB lookup operations is further illustrated by the flow diagram of FIG. 1D.

Processing begins with process block 160, and proceeds to process block 162, wherein the destination address of a received packet is extracted. In process block 164, a lookup operation is performed in the first FIB, which includes walking the first tree to find the corresponding leaf node based on the destination address. As determined in process block 165, if the end result has not been determined, then, in process block 166, a next lookup operation is performed in the next FIB, which includes walking the next tree to find the corresponding leaf node based on the destination address. Processing returns to process block 165. After all FIB lookup operations, each including a tree traversal, have been completed, the packet is forwarded according to the end result in process block 168. Processing is complete as indicated by process block 169.

SUMMARY

Disclosed are, inter alia, methods, apparatus, data structures, computer-readable media, mechanisms, and means for maintaining and using a data structure for storing and accessing multiple independent sets of forwarding information and their use. One embodiment includes a data structure including forwarding information for multiple forwarding information bases, the forwarding information bases including a first forwarding information base and a second forwarding information base.

In one embodiment, the data structure includes: leaf nodes, and an address lookup data structure for identifying leaf nodes based on a network address and a forwarding information base of the forwarding information base or bases being currently searched, such that each leaf node corresponds to a network address of at least one of the forwarding information bases. Each particular leaf node corresponds to a particular network address. Each particular leaf node includes: forwarding information of the first forwarding information base at least when the particular network address identifies an entry in the first forwarding information base, and forwarding information of the second forwarding information base at least when the particular network address identifies an entry in the second forwarding information base, with at least one leaf node includes forwarding information from both the first forwarding information base and the second forwarding information base.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
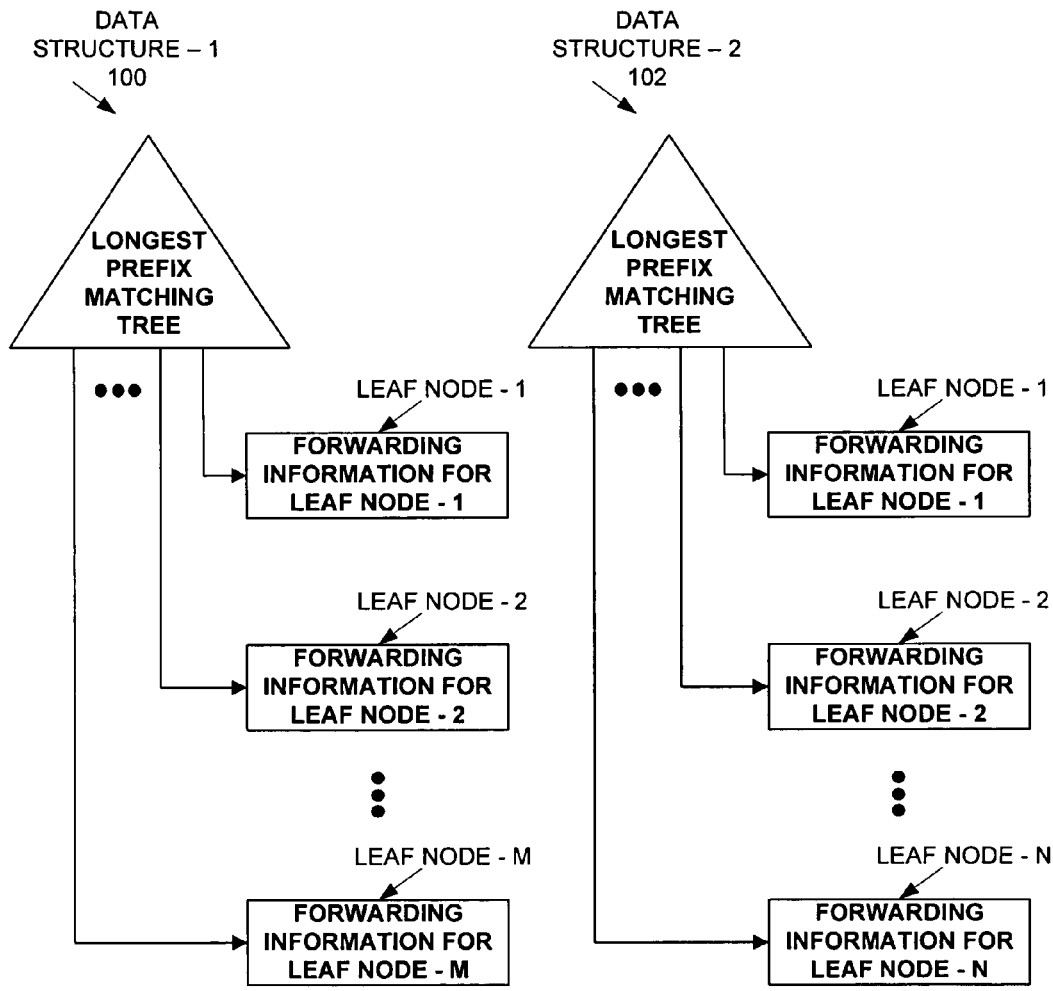
FIGS. 1A-D illustrate prior approaches to performing lookup operations in multiple forwarding information bases.
Figure 1B:
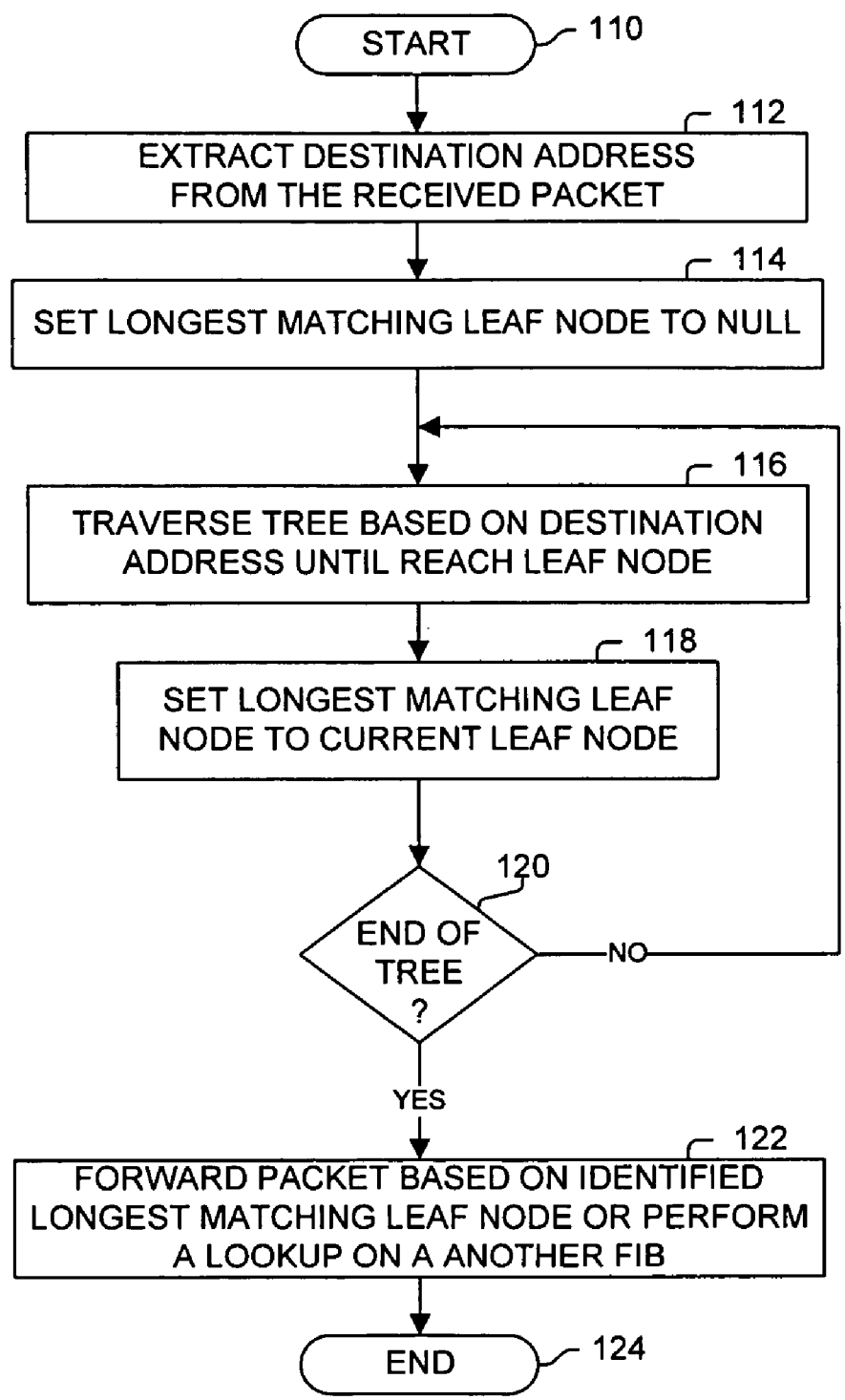
Figure 1C:
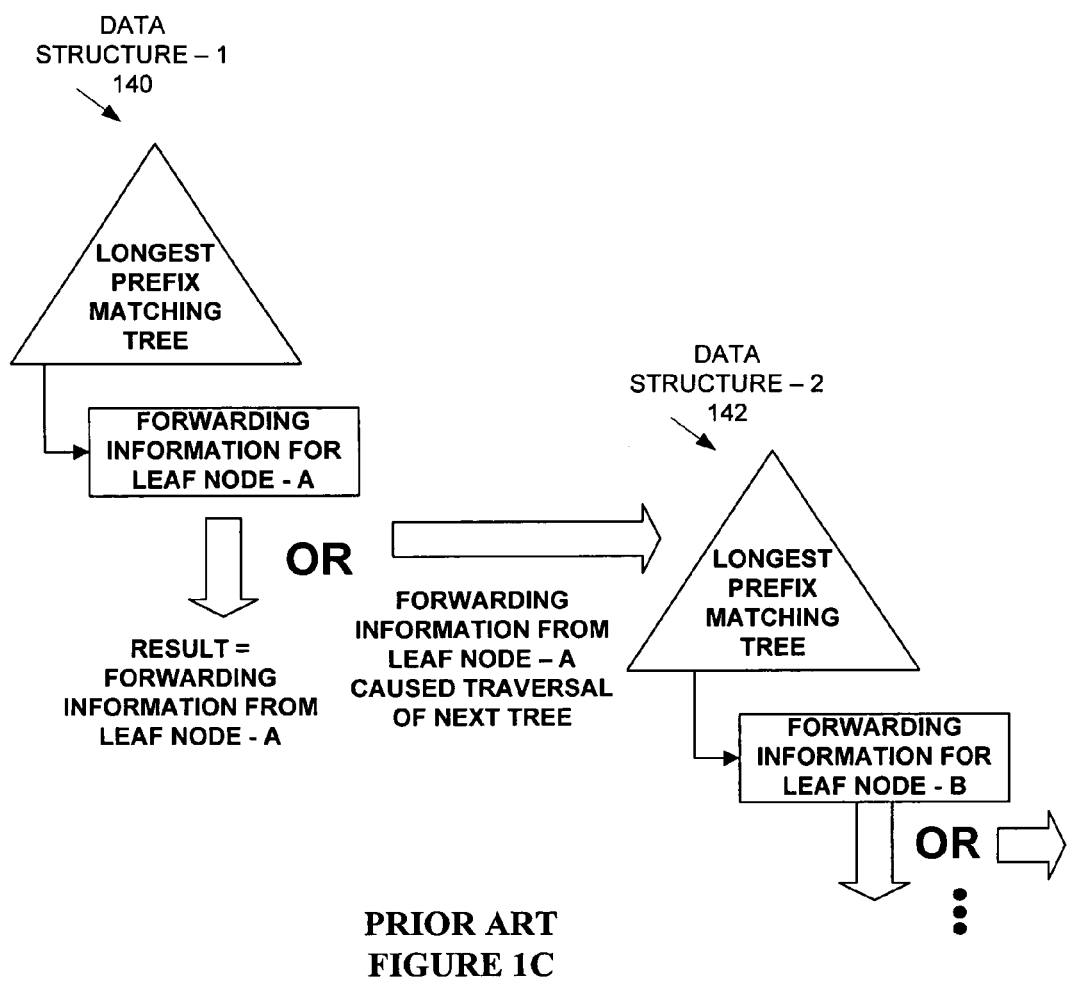
Figure 1D:
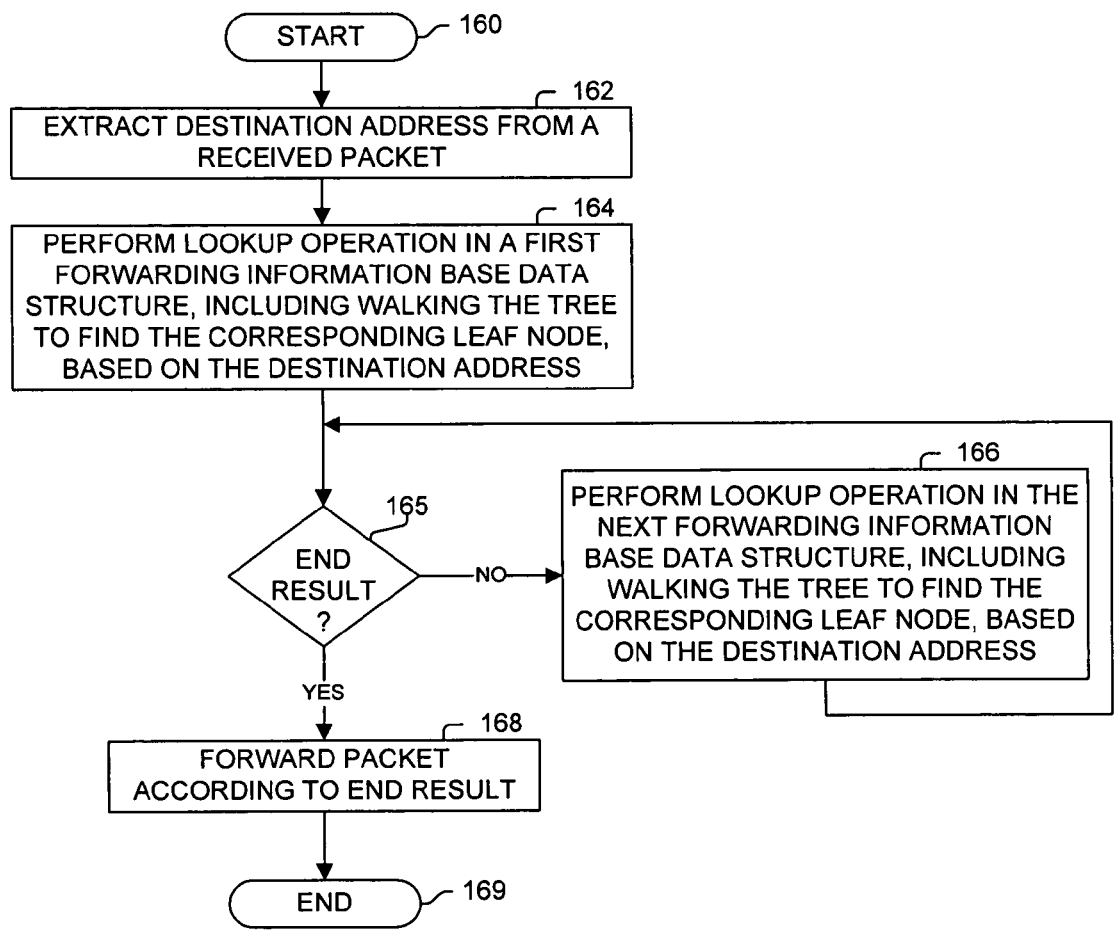

Disclosed are, inter alia, methods, apparatus, data structures, computer-readable media, mechanisms, and means for maintaining and using a data structure for storing and accessing multiple independent sets of forwarding information and their use. One embodiment includes a data structure including forwarding information for multiple forwarding information bases, the forwarding information bases including a first forwarding information base and a second forwarding information base.

For example, in one embodiment, stored in the leaf nodes of a data structure that can be used for identifying the longest prefix matching an address are corresponding values from multiple forwarding information bases. A single common address lookup data structure (e.g., a tree, trie, etc.) can be used, and a leaf node can contain information from multiple forwarding information bases. If lookup operations are performed for a single address in multiple forwarding information bases, the single common address lookup data structure may only need to be traversed once. For example, the forwarding information for another forwarding information base may be stored in the same leaf, further down in the data structure requiring traversal from the current position, or above requiring traversal from the root of the lookup data structure. Information can be stored in the leaf node to indicate which traversal option is appropriate for a particular forwarding information base.

Note, the term "forwarding information" as used herein refers to both direct and indirect forwarding information used to forward packets. In other words, "forwarding information" refers the actual forwarding information as well as pointers or references to a table which stores the actual forwarding information. For example, the data structure may include a forwarding table, with leaf nodes including references to entries in the forwarding table, where the table entries contain the actual forwarding information. Thus, multiple leafs can point to the same entry, which allows the update of a single table entry to update the forwarding information for multiple leafs. Also, this may allow a more efficient implementation of the data structure.

Also note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage mechanisms. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units.

Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable media, mechanisms, and means for maintaining and using a data structure for storing and accessing multiple independent sets of forwarding information and their use. One embodiment includes a data structure including forwarding information for multiple forwarding information bases, the forwarding information bases including a first forwarding information base and a second forwarding information base.

In one embodiment, the data structure includes: leaf nodes, and an address lookup data structure for identifying leaf nodes based on a network address and a forwarding information base of the forwarding information base or bases being currently searched, such that each leaf node corresponds to a network address of at least one of the forwarding information bases. Each particular leaf node corresponds to a particular network address. Each particular leaf node includes: forwarding information of the first forwarding information base at least when the particular network address identifies an entry in the first forwarding information base, and forwarding information of the second forwarding information base at least when the particular network address identifies an entry in the second forwarding information base, with at least one leaf node including forwarding information from both the first forwarding information base and the second forwarding information base.

In one embodiment, at least two leaf nodes each include forwarding information from both the first forwarding information base and the second forwarding information base. In one embodiment, the plurality of forwarding information bases include a third forwarding information base; and wherein at least two leaf nodes each include forwarding information from the first forwarding information base, the second forwarding information base, and the third forwarding information base. In one embodiment, at least one of the leaf nodes includes an indication of whether or not there are more leaf nodes referenced further down in the address lookup data structure than the corresponding reference to said at least one of the plurality of leaf nodes containing forwarding information of the first forwarding information base. In one embodiment, each particular leaf node includes an indication of whether or not there are more leaf nodes referenced further down in the address lookup data structure than the corresponding reference to the particular leaf node containing forwarding information for each of the forwarding information bases represented in the particular leaf node. In one embodiment, said at least one leaf node includes a particular leaf node associated with a particular network address; and wherein the forwarding information of the first forwarding information base in the particular leaf node includes an indication to perform another lookup in the second forwarding information base based on the particular network address; and wherein the particular node includes said forwarding information of the second information base corresponding to the particular network address.

One embodiment performs a method for performing lookup operations on a forwarding information base data structure representative of a plurality of different forwarding information bases, the forwarding information base data structure including a plurality of leaf nodes and an address lookup data structure for identifying leaf nodes of the plurality of leaf nodes based on network addresses and which of the plurality of forwarding information bases is being currently searched, wherein each leaf node of the plurality of leaf nodes includes forwarding information of at least one of the plurality of forwarding information bases for a corresponding network address. In one embodiment, the method comprises: performing a lookup operation on an address lookup data structure based on a particular address of a particular packet and an identification that a first forwarding information base of the plurality of forwarding information bases is being currently searched to identify a particular leaf node of the plurality of leaf nodes corresponding to the particular address and the first forwarding information base, the leaf node including a plurality of forwarding information fields, with each of the plurality of forwarding information fields corresponding to forwarding information of different said forwarding information bases, the plurality of forwarding information fields including: the first forwarding information field and a second forwarding information field corresponding to a second forwarding information base of the plurality of forwarding information bases; and forwarding the particular packet based on the contents of the first forwarding information field and second forwarding information field without having to perform any further lookup operations on the address lookup data structure.

One embodiment includes analyzing the contents of the particular leaf node to identifying that the required forwarding information of the second forwarding information base in stored in the second forwarding information field.

One embodiment performs a method for performing lookup operations on a forwarding information base data representative of a plurality of different forwarding information bases, the forwarding information base data structure including a plurality of leaf nodes and an address lookup data structure for identifying leaf nodes of the plurality of leaf nodes based on network addresses and which of the plurality of forwarding information bases is being currently searched, such that each leaf node of the plurality of leaf nodes includes forwarding information of at least one of the plurality of forwarding information bases for a corresponding network address. In one embodiment, the method includes: performing a lookup operation on an address lookup data structure based on a particular address of a particular packet and an identification that a first forwarding information base of the plurality of forwarding information bases is being currently searched to identify a particular leaf node of the plurality of leaf nodes corresponding to the particular address, the leaf node including a first forwarding information field corresponding to the first forwarding information base; retrieving from the forwarding information base data structure: second forwarding information of a second forwarding information base of the plurality of forwarding information bases, said second forwarding information corresponding to the particular address; and forwarding the particular packet based on the contents of the first forwarding information field and the second forwarding information.

One embodiment includes analyzing information included in the particular leaf node to identify whether or not the second forwarding information is located in the particular leaf node. In one embodiment, the particular leaf node includes the second forwarding information. One embodiment includes analyzing information included in the particular leaf node to identify whether or not the second forwarding information is potentially located in a second particular leaf node referenced further down than the reference to the particular leaf node in the address lookup data structure. In one embodiment, in response to said identifying that the second forwarding information is potentially located in the second particular leaf node referenced further down in the address lookup data structure, performing further lookup operations in the address lookup data structure based on the particular address from a position corresponding to the particular leaf node to either identify the particular leaf node as contains the second forwarding information or the second particular leaf node contains the second forwarding information. One embodiment includes analyzing information included in the particular leaf node to identify that the second forwarding information is located in a second leaf node referenced above the reference to the particular leaf node in the address lookup data structure, and in response, performing a second lookup operation in the address lookup data structure base on the particular address for the second forwarding information base to identify the second leaf node.

One embodiment performs lookup operations on a forwarding information base data structure representative of a plurality of different forwarding information bases, the forwarding information base data structure including a plurality of leaf nodes and an address lookup data structure for identifying leaf nodes of the plurality of leaf nodes based on network addresses and which of the plurality of forwarding information bases is being currently searched, such that each leaf node of the plurality of leaf nodes includes forwarding information of at least one of the plurality of forwarding information bases for a corresponding network address.

One embodiment includes: means for a lookup operation on an address lookup data structure based on a particular address of a particular packet and an identification that a first forwarding information base of the plurality of forwarding information bases is being currently searched to identify a particular leaf node of the plurality of leaf nodes corresponding to the particular address, the leaf node including a first forwarding information field corresponding to the first forwarding information base; means for retrieving from the forwarding information base data structure: second forwarding information of a second forwarding information base of the plurality of forwarding information bases, said second forwarding information corresponding to the particular address; and a forwarding mechanism for forwarding the particular packet based on the contents of the first forwarding information field and the second forwarding information.

One embodiment includes means for analyzing information included in the particular leaf node to identify whether or not the second forwarding information is located in the particular leaf node. One embodiment includes means for analyzing information included in the particular leaf node to identify whether or not the second forwarding information is potentially located in a second particular leaf node referenced further down than the reference to the particular leaf node in the address lookup data structure.

One embodiment includes means for: in response to said identifying that the second forwarding information is potentially located in the second particular leaf node referenced further down in the address lookup data structure, performing further lookup operations in the address lookup data structure based on the particular address from a position corresponding to the particular leaf node to either identify the particular leaf node as contains the second forwarding information or the second particular leaf node contains the second forwarding information.

One embodiment includes means for analyzing information included in the particular leaf node to identify that the second forwarding information is located in a second leaf node referenced above the reference to the particular leaf node in the address lookup data structure, and in response, performing a second lookup operation in the address lookup data structure base on the particular address for the second forwarding information base to identify the second leaf node.

One embodiment includes one or more lookup engines for performing lookup operations on the data structure to identify said forwarding information to use in forwarding packets based on addresses of said packets.

Figure 2A:
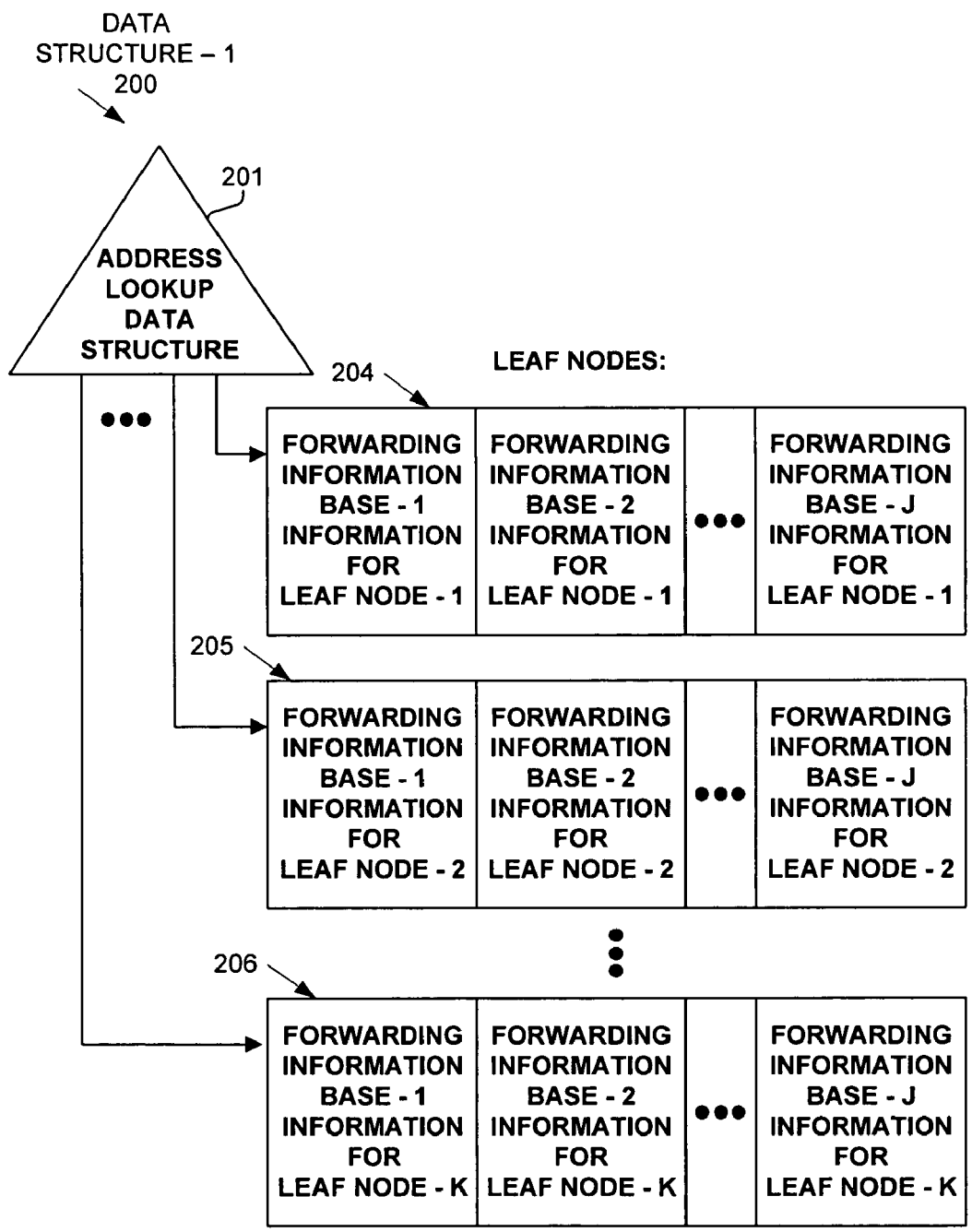
FIGS. 2A-B are block diagrams illustrating a couple of an unlimited number of variations of a data structure used in one embodiment.

Turning to the figures, FIG. 2A illustrates data structure-1 (200) which includes leaf nodes 204-206 (each typically corresponding to a single address) and an address lookup data structure 201, such as, but not limited to, a tree or a trie for identifying a matching or longest matching prefix to an input value or address. Data structure-1 (200) uses a single address lookup data structure 201 to access forwarding information of multiple forwarding information bases stored in leaf nodes 204-206. As illustrated in FIG. 2A, each leaf node includes storage space for each of the multiple forwarding information bases. Of course, different encoding schemes can be used such that space is only allocated for the FIB(s) contained in a leaf node.

Figure 2B:
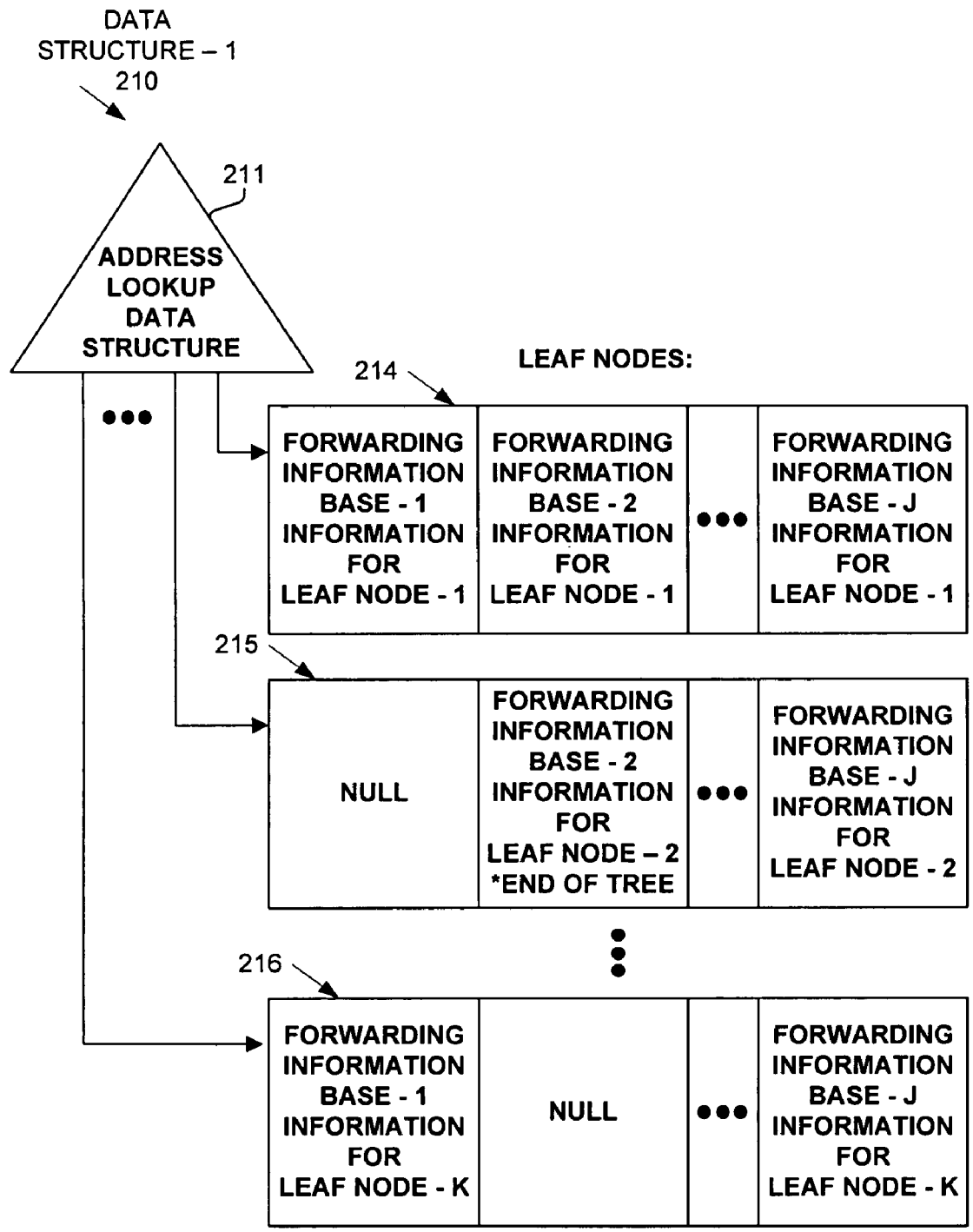

Similarly, FIG. 2B illustrates data structure-1 (210) which includes leaf nodes 214-216 and an address lookup data structure 211, such as, but not limited to, a tree or a trie for identifying a matching or longest matching prefix to an input value or address. Data structure-2 (210) uses a single address lookup data structure 211 to access forwarding information of multiple forwarding information bases stored in leaf nodes 214-216. FIG. 2B is primarily used to illustrate that the data included in a leaf node depends on the multiple forwarding bases represented in data structure-2 (210), and every leaf node will not necessarily have forwarding information for each of the multiple forwarding information bases as explicitly illustrated by leaf nodes 215 and 216, while, for example, leaf node 214 includes forwarding information for each of the multiple forwarding bases.

Different embodiments might use different implementations of leaf nodes. For example, some may include a bitmap or other indication of which of the multiple forwarding information bases are represented by a leaf node. Remember, a leaf node corresponds to a particular prefix value, and a leaf node will have a corresponding, non-null forwarding information for a particular forwarding information base if the forwarding information has an entry matching the particular prefix.

Also, by using a single address lookup data structure with leaf nodes containing forwarding information from multiple forwarding information bases, the lookup resources (e.g., time, CPU cycles, etc.) required to lookup a particular address in multiple forwarding information bases can often be greatly reduced.

Figure 2C:
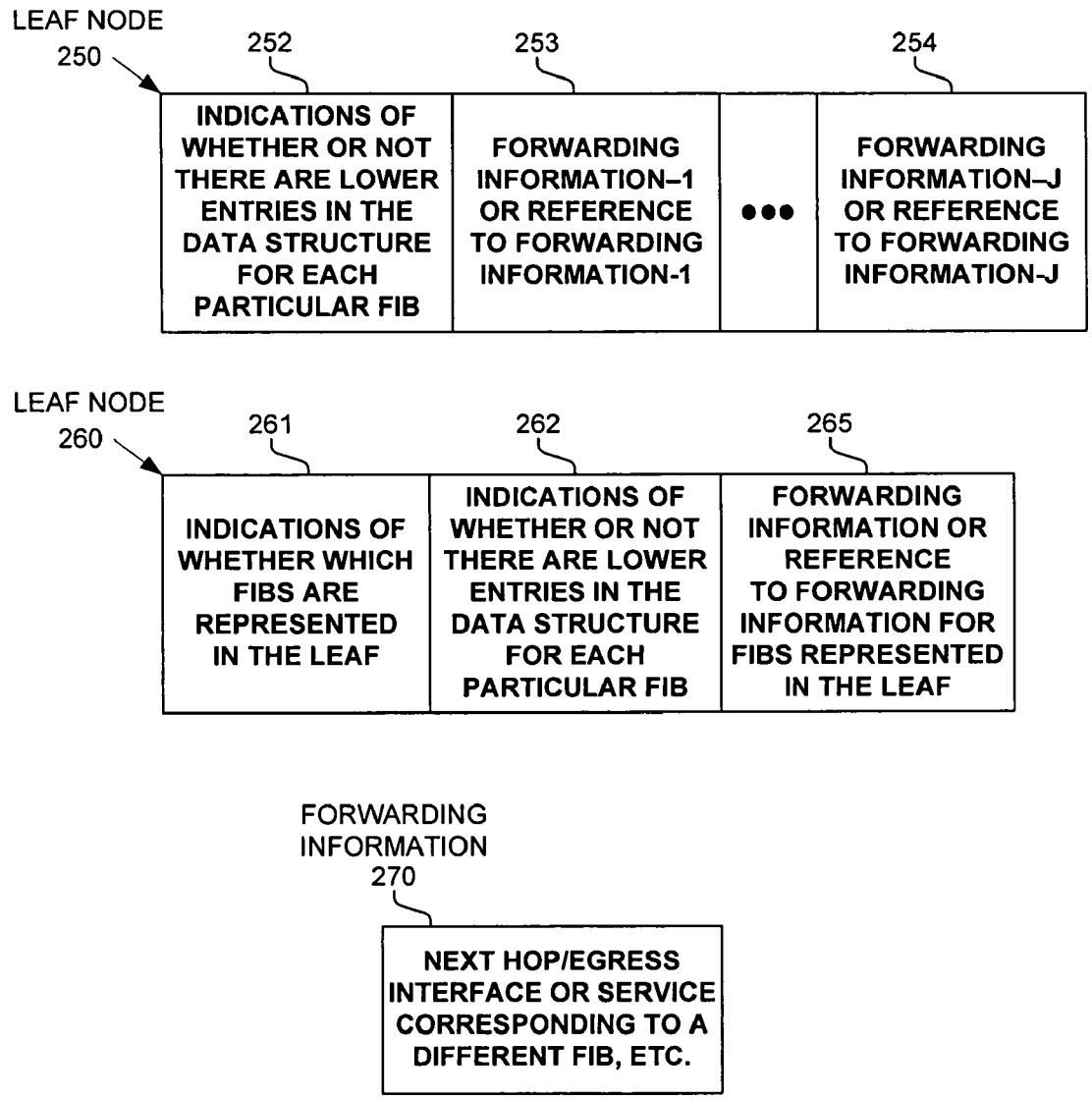
FIG. 2C is a block diagram illustrating a few of an unlimited number of variations of leaf nodes used in one embodiment.

FIG. 2C illustrates some various leaf nodes of an extensible number of leaf nodes that can be used in an embodiment. For example, leaf node 250 illustrates that a leaf node may include a bitmap or other indication 252 of which of the multiple forwarding information bases may have matching leaf nodes referenced lower in the address lookup data structure, as well as including forwarding information 253-254 corresponding to one or more forwarding information bases.

Leaf node 260 illustrates that a leaf node may include a bitmap or other indication 261 of which forwarding information bases are represented in leaf node 260, a bitmap or other indication 262 which of the multiple forwarding information bases may have matching leaf nodes referenced lower in the address lookup data structure, and forwarding information 265 for one or more corresponding forwarding information bases.

FIG. 2C also illustrates that forwarding information 270 stored in a leaf node is an extensible set of information required to forward a packet and/or further use to identify the final forwarding information used to forward a packet, such as, but not limited to next hop information, service information (VPNs, VLANs, etc.) which may or may not cause a lookup operation to be performed on another forwarding information base represented in the data structure.

Figure 3:
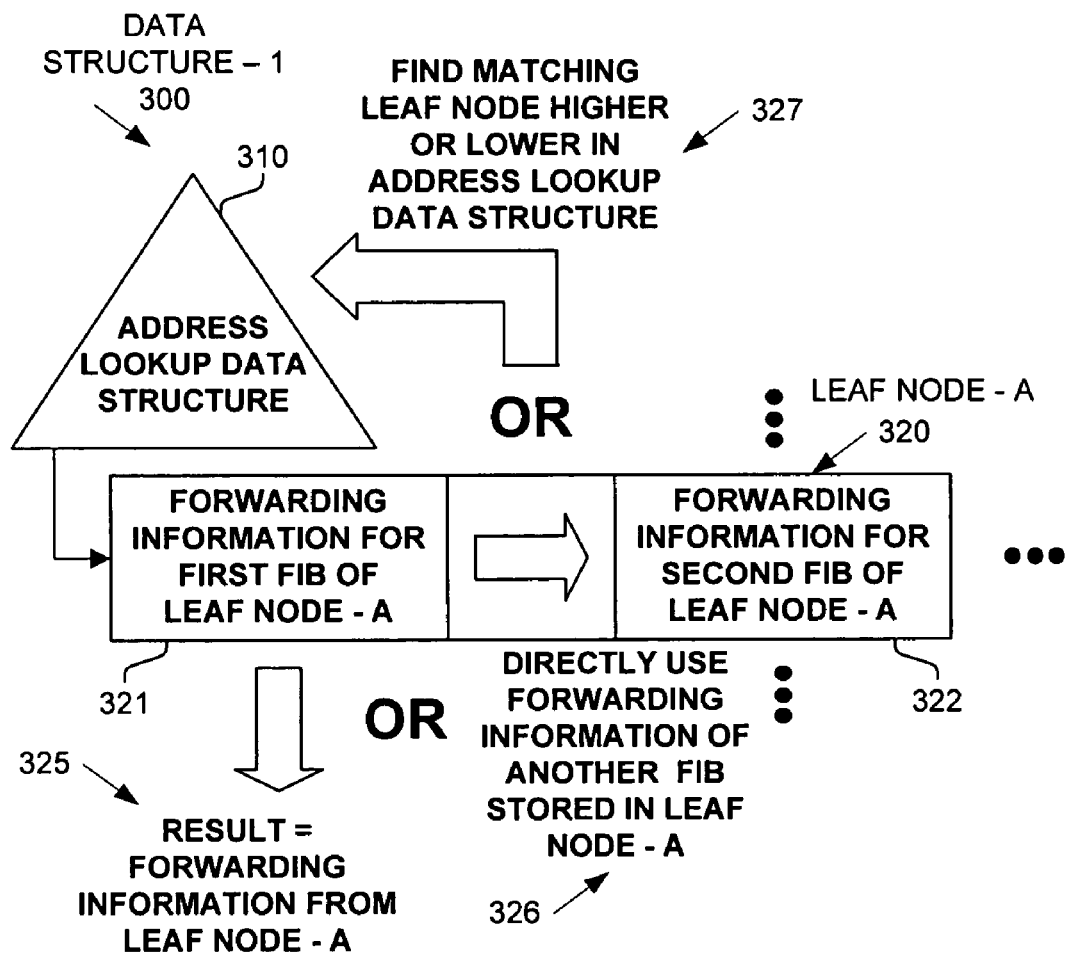
FIG. 3 is a block diagram illustrating lookup operations on multiple forwarding information bases as performed in one embodiment.

FIG. 3 illustrates some of these lookup scenarios using a data structure-1 (300) for performing a lookup operations for a particular address in one or more forwarding information bases. First, the address lookup data structure (310) is traversed to identify the leaf node-A (320) which corresponds to the longest matching prefix for the first forwarding information base. This result (i.e., forwarding information 321) can be directly used in forwarding the packet as indicated by reference 325. Additionally, second forwarding information corresponding to a second forwarding information base may be required for forwarding the packet, such as being predetermined or as a result of the forwarding information 325. This second forwarding information may be located in the same leaf node 325, or in another leaf node referenced above or below the reference to leaf node 320 in address lookup data structure 310, as indicated by references 326 and 327. Note, if it is known that the desired leaf node is either the same leaf node 325 or possibly another leaf node referenced further down in address lookup data structure 310, than the traversal of address lookup data structure can continue from this point rather than from the root of address lookup data structure 310.

Figure 4:
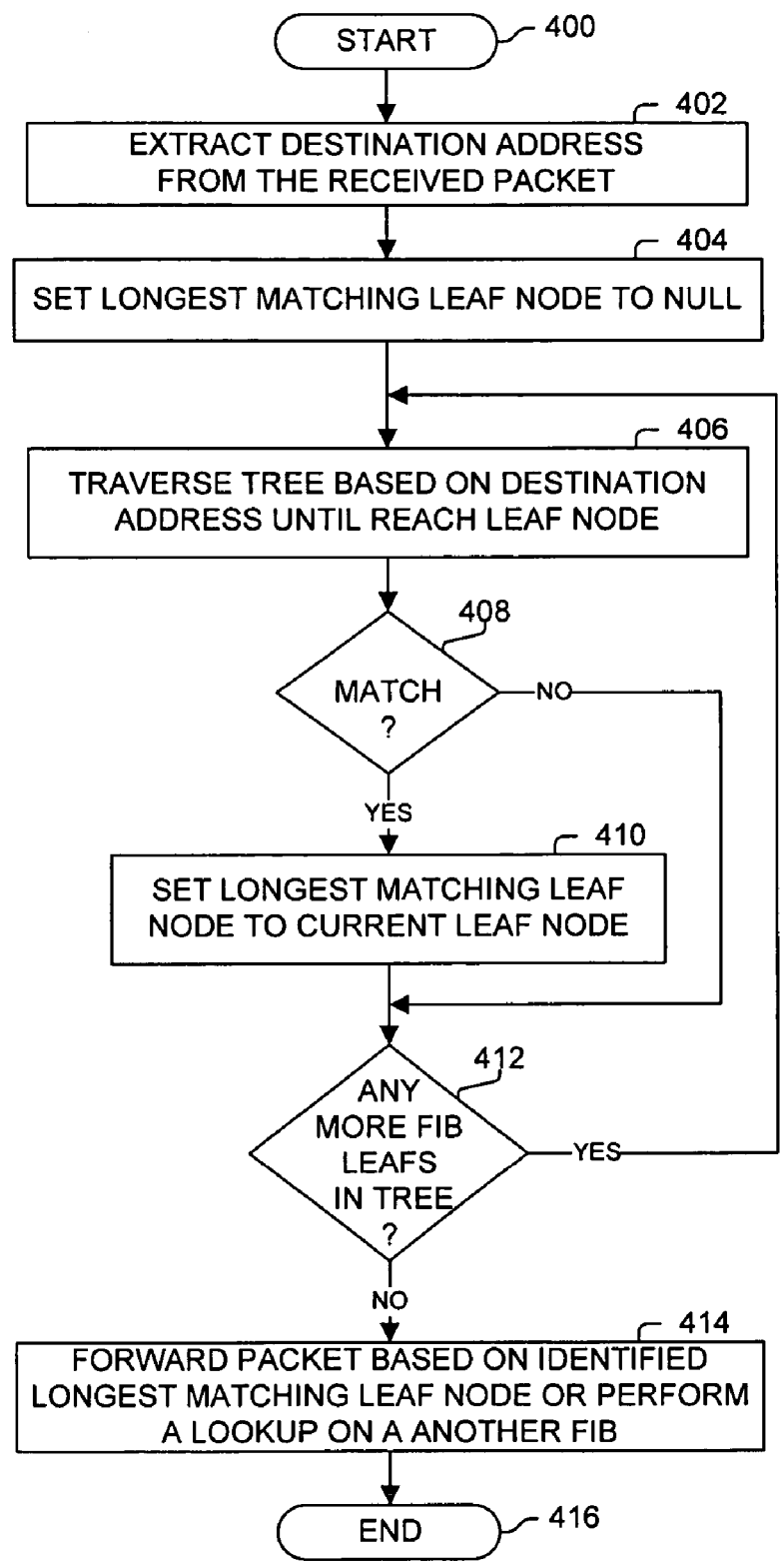
FIG. 4 is a flow diagram illustrating a lookup operation on one of multiple forwarding information base represented in a single data structure as performed in one embodiment.

FIG. 4 is a flow diagram illustrating a lookup operation in one of multiple forwarding information base represented in a single data structure as performed in one embodiment. Processing begins with process block 400, and proceeds to process block 402, wherein the destination address is extracted from the received packet. In process block 404, the longest matching leaf node is set to NULL (i.e., no match located). In process block 406, the longest prefix matching tree is traversed until a leaf node is reached. As determined in process block 408, if the leaf node corresponds to the particular forwarding information base on which the lookup operation is being performed, then in process block 410, the longest matching leaf node is set to the current leaf node. As determined in process block 412, if there are any more leafs corresponding to the particular forwarding information base in the data structure (such as, but not limited to that identified by indication 252 or 262 of FIG. 2C), then processing returns to process block 406. Otherwise, the leaf node corresponding to the longest matching prefix has been identified, and in process block 414, the packet is forwarded based on the forwarding information stored in this leaf node. Processing is complete as indicated by process block 416.

Figure 5:
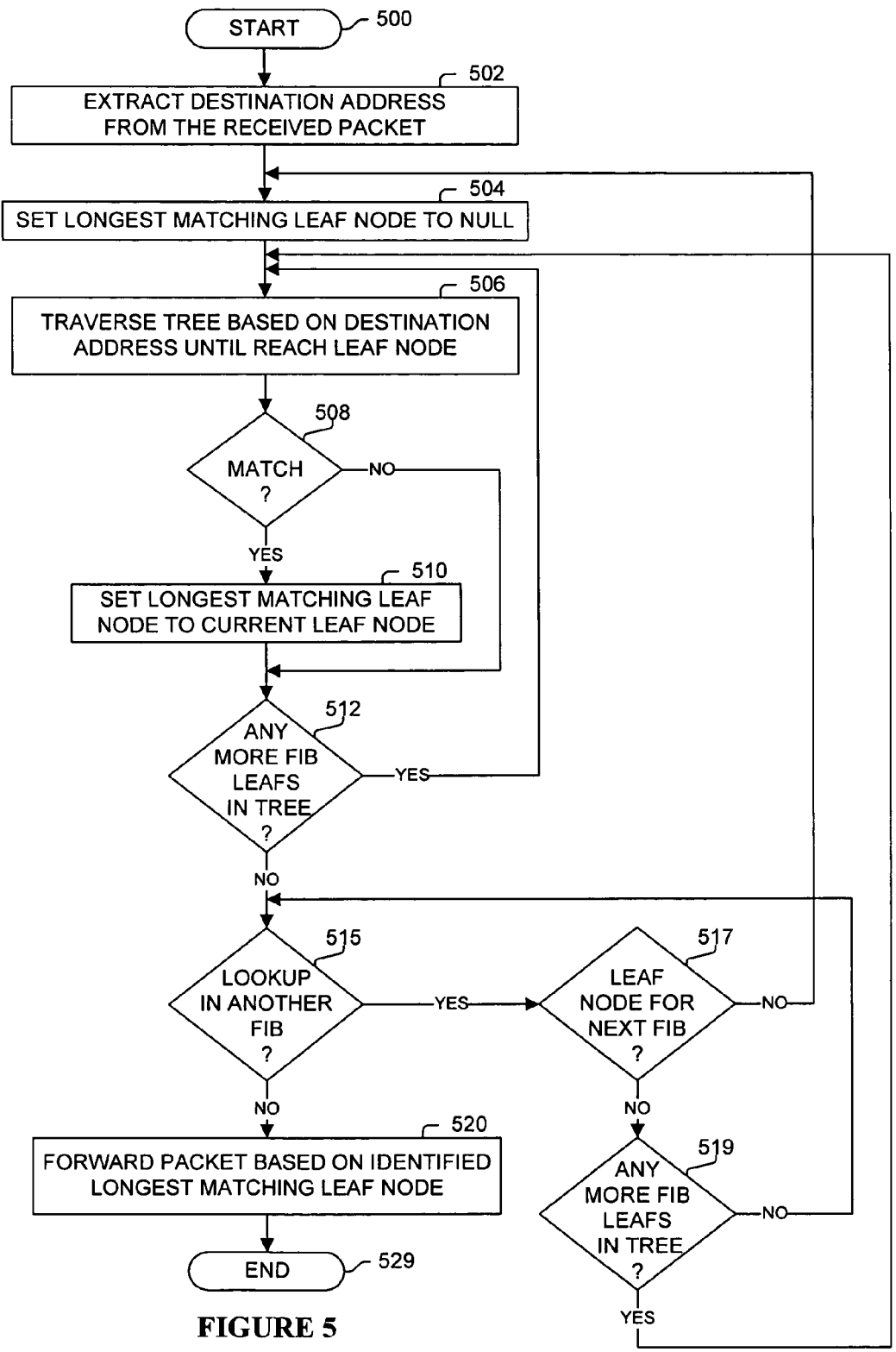
FIG. 5 is a flow diagram illustrating a lookup operation on multiple forwarding information bases represented in a single data structure as performed in one embodiment.

FIG. 5 is a flow diagram illustrating a lookup operation on multiple forwarding information bases represented in a single data structure as performed in one embodiment. Processing begins with process block 500, and proceeds to process block 502, wherein the destination address is extracted from the received packet. In process block 504, the longest matching leaf node is set to NULL (i.e., no match located). In process block 506, the longest prefix matching tree is traversed until a leaf node is reached. As determined in process block 508, if the leaf node corresponds to the particular forwarding information base on which the lookup operation is being performed, then in process block 510, the longest matching leaf node is set to the current leaf node. As determined in process block 512, if there are any more leafs corresponding to the particular forwarding information base in the data structure (such as, but not limited to that identified by indication 252 or 262 of FIG. 2C), then processing returns to process block 506. Otherwise, the leaf node corresponding to the longest matching prefix has been identified for the particular forwarding information base. As determined in process block 515, if a lookup operation for the address should be performed in another forwarding information base, either predetermined or as a result of the forwarding information associated with a previous leaf node corresponding to a longest prefix match to a forwarding information base, then processing proceeds to process block 517; otherwise in process block 520, the packet is forwarded based on the forwarding information stored in the current and/or previously identified leaf nodes matching the address; and processing is complete as indicated by process block 529. Otherwise, as determined in process block 517, if the current leaf node does not include forwarding information for the next forwarding information base on which a lookup being performed, then processing returns to process block 504 to search from the root of the address lookup mechanism. Otherwise, as determined in process block 519, if there are any more leafs corresponding to the particular forwarding information base in the data structure (such as, but not limited to that identified by indication 252 or 262 of FIG. 2C), then processing returns to process block 506; otherwise, the forwarding information for the next forwarding information base is stored in the current leaf node, and processing proceeds to process block 515.

Figure 6A:
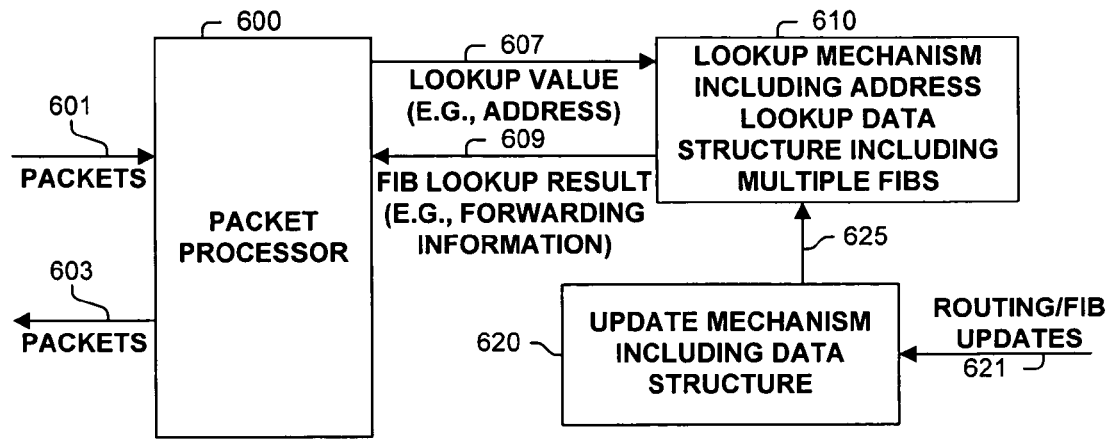
FIG. 6A is a block diagram of a system or component used in one embodiment.

FIG. 6A is a block diagram of a system or component used in one embodiment. As shown, packets 601 are received by packet processor 600. In performing determining how to forward a received packet, the destination address of the packet is provided (607) to lookup mechanism 610, which typically includes lookup data structure (e.g., the leaf nodes and the address lookup data structure). The lookup result is provided (609) to packet processor 600. In one embodiment, the data structure of lookup mechanism 610 are updated (625) by update mechanism 620 based on received routing updates (e.g., BGP, IGP updates) 621.

Figure 6B:
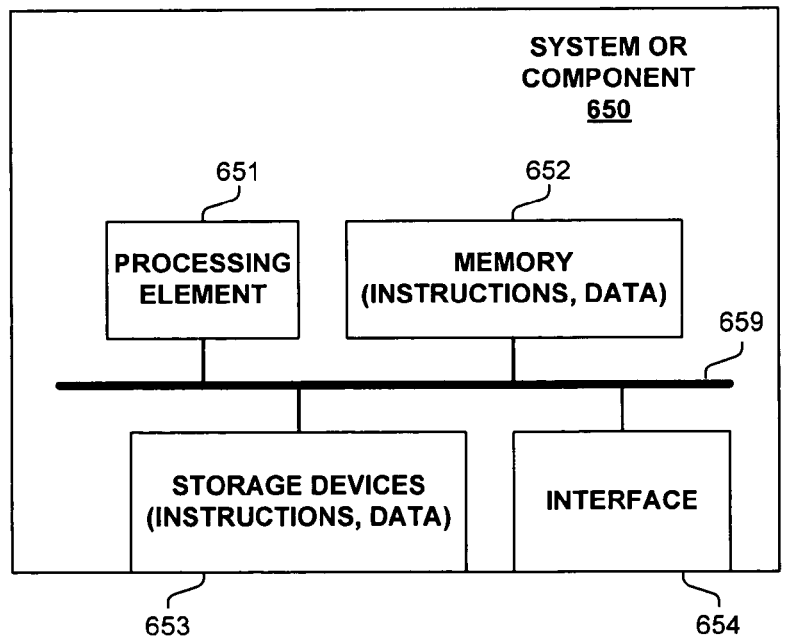
FIG. 6B is a block diagram of a system or component used in one embodiment.

FIG. 6B is a block diagram of a system component 650 used in one embodiment searching for maintaining and using a data structure including forwarding information for multiple forwarding information bases. In one embodiment, system or component 650 performs one or more processes corresponding to one of the flow diagrams illustrated or otherwise described herein.

In one embodiment, system or component 650 includes a processing element 651, memory 652, storage devices 653, an interface 654 for sending and receiving information/data items and/or communicating with external devices (e.g. one or more memories and/or lookup mechanisms), which are typically coupled via one or more communications mechanisms 659, with the communications paths typically tailored to meet the needs of the application. Various embodiments of component 650 may include more or less elements. The operation of component 650 is typically controlled by processing element 651 using memory 652 and storage devices 653 to perform one or more tasks or processes. Memory 652 is one type of computer-readable medium, and typically comprises random access memory (RAM), read only memory (ROM), flash memory, integrated circuits, and/or other memory components. Memory 652 typically stores computer-executable instructions to be executed by processing element 651 and/or data which is manipulated by processing element 651 for implementing functionality in accordance with an embodiment. Storage devices 653 are another type of computer-readable medium, and typically comprise solid state storage media, disk drives, diskettes, networked services, tape drives, and other storage devices. Storage devices 653 typically store computer-executable instructions to be executed by processing element 651 and/or data which is manipulated by processing element 651 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for performing lookup operations on a forwarding information base data structure tangibly embodied in one or more tangible computer-readable media and representative of a plurality of different forwarding information bases, the forwarding information base data structure including a plurality of leaf nodes and an address lookup data structure for identifying leaf nodes of the plurality of leaf nodes based on network addresses and which of the plurality of forwarding information bases is being currently searched, wherein each leaf node of the plurality of leaf nodes includes forwarding information of at least one of the plurality of forwarding information bases for a corresponding network address, the method comprising:

performing a lookup operation on an address lookup data structure based on a particular address of a particular packet and an identification that a first forwarding information base of the plurality of forwarding information bases is being currently searched to identify a particular leaf node of the plurality of leaf nodes corresponding to the particular address and the first forwarding information base, the particular leaf node including a plurality of forwarding information fields, with each of the plurality of forwarding information fields corresponding to forwarding information of different said forwarding information bases, the plurality of forwarding information fields including: the first forwarding information field and a second forwarding information field corresponding to a second forwarding information base of the plurality of forwarding information bases; and forwarding the particular packet based on the contents of the first forwarding information field and second forwarding information field without having to perform any further lookup operations on the address lookup data structure.

2. The method of claim 1, comprising: analyzing the contents of the particular leaf node to identifying that the required forwarding information of the second forwarding information base stored in the second forwarding information field.

3. A method for performing lookup operations on a forwarding information base data structure tangibly embodied in one or more tangible computer-readable media and representative of a plurality of different forwarding information bases, the forwarding information base data structure including a plurality of leaf nodes and an address lookup data structure for identifying leaf nodes of the plurality of leaf nodes based on network addresses and which of the plurality of forwarding information bases is being currently searched, such that each leaf node of the plurality of leaf nodes includes forwarding information of at least one of the plurality of forwarding information bases for a corresponding network address, the method comprising:

performing a lookup operation on an address lookup data structure based on a particular address of a particular packet and an identification that a first forwarding information base of the plurality of forwarding information bases is being currently searched to identify a particular leaf node of the plurality of leaf nodes corresponding to the particular address, the particular leaf node including a first forwarding information field corresponding to the first forwarding information base;

retrieving from the forwarding information base data structure: second forwarding information of a second forwarding information base of the plurality of forwarding information bases, said second forwarding information corresponding to the particular address; and forwarding the particular packet based on the contents of the first forwarding information field and the second forwarding information;

wherein at least one leaf node of the plurality of leaf nodes includes forwarding information from both the first forwarding information base and the second forwarding information base.

4. The method of claim 3, comprising: analyzing information included in the particular leaf node to identify whether or not the second forwarding information is located in the particular leaf node.

5. The method of claim 3, wherein the particular leaf node includes the second forwarding information.

6. The method of claim 3, comprising: analyzing information included in the particular leaf node to identify whether or not the second forwarding information is potentially located in a second particular leaf node referenced further down than the reference to the particular leaf node in the address lookup data structure.

7. The method of claim 6, in response to said identifying that the second forwarding information is potentially located in the second particular leaf node referenced further down in the address lookup data structure, performing further lookup operations in the address lookup data structure based on the particular address from a position corresponding to the particular leaf node to either identify the particular leaf node as contains the second forwarding information or the second particular leaf node contains the second forwarding information.

8. The method of claim 3, comprising: analyzing information included in the particular leaf node to identify that the second forwarding information is located in a second leaf node referenced above the reference to the particular leaf node in the address lookup data structure, and in response, performing a second lookup operation in the address lookup data structure base on the particular address for the second forwarding information base to identify the second leaf node.

9. One more tangible computer-readable media tangibly embodying computer-executable instructions for performing operations for performing lookup operations on a forwarding information base data structure representative of a plurality of different forwarding information bases, the forwarding information base data structure including a plurality of leaf nodes and an address lookup data structure for identifying leaf nodes of the plurality of leaf nodes based on network addresses and which of the plurality of forwarding information bases is being currently searched, such that each leaf node of the plurality of leaf nodes includes forwarding information of at least one of the plurality of forwarding information bases for a corresponding network address, the method comprising:

performing a lookup operation on an address lookup data structure based on a particular address of a particular packet and an identification that a first forwarding information base of the plurality of forwarding information bases is being currently searched to identify a particular leaf node of the plurality of leaf nodes corresponding to the particular address, the particular leaf node including a first forwarding information field corresponding to the first forwarding information base;

retrieving from the forwarding information base data structure: second forwarding information of a second forwarding information base of the plurality of forwarding information bases, said second forwarding information corresponding to the particular address; and forwarding the particular packet based on the contents of the first forwarding information field and the second forwarding information;

wherein at least one leaf node of the plurality of leaf nodes includes forwarding information from both the first forwarding information base and the second forwarding information base.

10. The computer-readable media of claim 9, wherein said operations comprise: analyzing information included in the particular leaf node to identify whether or not the second forwarding information is located in the particular leaf node.

11. The computer-readable media of claim 9, wherein said operations comprise: analyzing information included in the particular leaf node to identify whether or not the second forwarding information is potentially located in a second particular leaf node referenced further down than the reference to the particular leaf node in the address lookup data structure.

12. The computer-readable media of claim 11, wherein said operations comprise: in response to said identifying that the second forwarding information is potentially located in the second particular leaf node referenced further down in the address lookup data structure, performing further lookup operations in the address lookup data structure based on the particular address from a position corresponding to the particular leaf node to either identify the particular leaf node as contains the second forwarding information or the second particular leaf node contains the second forwarding information.

13. The computer-readable media of claim 9, wherein said operations comprise: analyzing information included in the particular leaf node to identify that the second forwarding information is located in a second leaf node referenced above the reference to the particular leaf node in the address lookup data structure, and in response, performing a second lookup operation in the address lookup data structure base on the particular address for the second forwarding information base to identify the second leaf node.

14. An apparatus for performing lookup operations on a forwarding information base data structure tangibly embodied in one or more tangible computer-readable media and representative of a plurality of different forwarding information bases, the forwarding information base data structure including a plurality of leaf nodes and an address lookup data structure for identifying leaf nodes of the plurality of leaf nodes based on network addresses and which of the plurality of forwarding information bases is being currently searched, such that each leaf node of the plurality of leaf nodes includes forwarding information of at least one of the plurality of forwarding information bases for a corresponding network address, the apparatus comprising:

means for a lookup operation on an address lookup data structure based on a particular address of a particular packet and an identification that a first forwarding information base of the plurality of forwarding information bases is being currently searched to identify a particular leaf node of the plurality of leaf nodes corresponding to the particular address, the particular leaf node including a first forwarding information field corresponding to the first forwarding information base;

means for retrieving from the forwarding information base data structure: second forwarding information of a second forwarding information base of the plurality of forwarding information bases, said second forwarding information corresponding to the particular address; and a forwarding mechanism for forwarding the particular packet based on the contents of the first forwarding information field and the second forwarding information;

wherein at least one leaf node of the plurality of leaf nodes includes forwarding information from both the first forwarding information base and the second forwarding information base.

15. The apparatus of claim 14, comprising: means for analyzing information included in the particular leaf node to identify whether or not the second forwarding information is located in the particular leaf node.

16. The apparatus of claim 14, comprising: means for analyzing information included in the particular leaf node to identify whether or not the second forwarding information is potentially located in a second particular leaf node referenced further down than the reference to the particular leaf node in the address lookup data structure.

17. The apparatus of claim 16, means for, in response to said identifying that the second forwarding information is potentially located in the second particular leaf node referenced further down in the address lookup data structure, performing further lookup operations in the address lookup data structure based on the particular address from a position corresponding to the particular leaf node to either identify the particular leaf node as contains the second forwarding information or the second particular leaf node contains the second forwarding information.

18. The apparatus of claim 14, comprising: means for analyzing information included in the particular leaf node to identify that the second forwarding information is located in a second leaf node referenced above the reference to the particular leaf node in the address lookup data structure, and in response, performing a second lookup operation in the address lookup data structure base on the particular address for the second forwarding information base to identify the second leaf node.

19. An apparatus for performing lookup operations to identify forwarding information for packets, the apparatus comprising:

one or more computer-readable media configured to store a data structure including forwarding information for a plurality of forwarding information bases, the forwarding information bases including a first forwarding information base and a second forwarding information base, the data structure including: a plurality of leaf nodes; and an address lookup data structure for identifying leaf nodes of the plurality of leaf nodes based on a network address and a forwarding information base of the plurality of forwarding information bases being currently searched, such that each leaf node of the plurality of leaf nodes corresponds to a network address of at least one of the plurality of forwarding information bases; wherein each particular leaf node of the plurality of leaf nodes corresponds to a particular network address, and said each particular leaf node includes: forwarding information of the first forwarding information base at least when the particular network address identifies an entry in the first forwarding information base, and forwarding information of the second forwarding information base at least when the particular network address identifies an entry in the second forwarding information base; and wherein at least one leaf node of the plurality of leaf nodes includes forwarding information from both the first forwarding information base and the second forwarding information base; and one or more lookup engines for performing lookup operations on the data structure to identify said forwarding information to use in forwarding packets based on addresses of said packets.

* * * * *